Oct. 15, 1946.  L. A. MEKLER  2,409,376
METHOD AND MEANS FOR CONTROLLING THE
COOLING OF CONVECTIVE FLUID STREAMS
Filed June 8, 1942
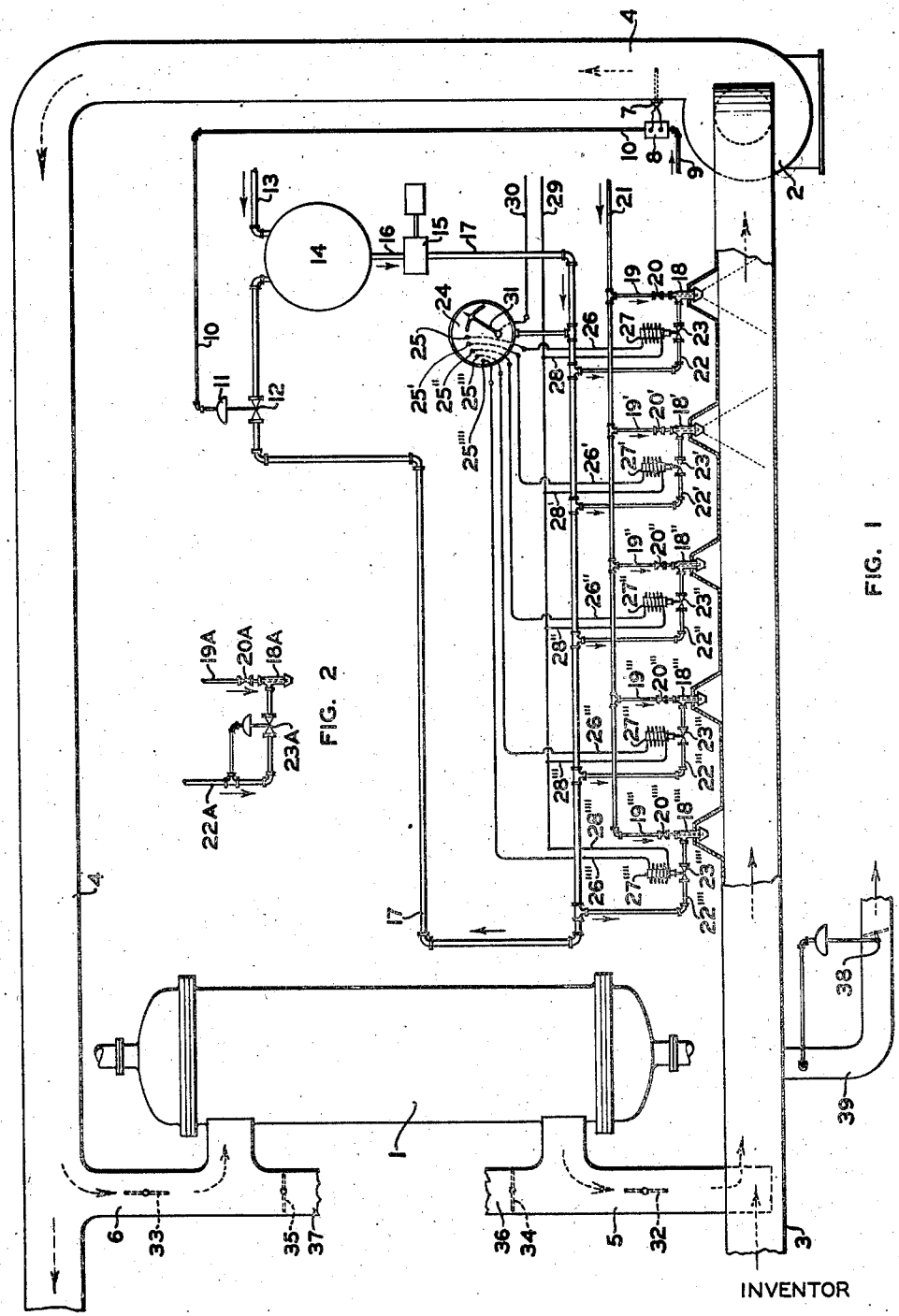
INVENTOR
LEV A. MEKLER
BY
ATTORNEY

UNITED STATES PATENT OFFICE 2,409,376

METHOD AND MEANS FOR CONTROLLING THE COOLING OF CONVECTIVE FLUID STREAMS

Lev A. Mekler, Washington, D. C., assignor to Universal Oil Products Company, Chicago, Ill., a corporation of Delaware Application June 8, 1942, Serial No. 446,306

5 Claims. (Cl. 23—1)

This invention relates to an improved method and means for the controlled cooling of a stream of convective fluid and is particularly applicable to systems wherein the convective fluid, comprising substantially steam, is cooled by the evaporation of water introduced thereinto.

In many catalytic processes such as, for instance, in the dehydrogenation of butane to butene, a deleterious deposit of hydrocarbonaceous material accumulates upon the catalyst particles during the processing period which, unless removed, will render the catalyst unfit for further use. Removal of this material is usually accomplished by passing oxygen-containing gases in controlled quantities through the catalyst mass to burn off the contaminating deposit. This burning is accompanied by the generation of considerable quantities of heat which, if not removed, will cause the catalyst to reach excessive temperatures and permanently destroy its usefulness. In order to satisfactorily dissipate this overabundance of heat a suitable convective medium, such as steam, may be passed in heat exchange relationship with the catalyst mass and the heat removed thereby from the reaction zone. The stream of convective fluid is then cooled and again recirculated through the catalyst chamber.

The present invention provides a method and means for controlling the cooling of this recirculating stream of convective fluid in an efficient and accurate manner by employing a plurality of spray nozzles for the introduction of water into said stream between its exit and the re-entrance into the catalyst chamber. In the invention, by increasing the number of spray nozzles in operation as the temperature of the stream of convective fluid tends to rise and, in turn, by decreasing the number of nozzles in operation as the temperature tends to become less, the maximum spraying efficiency of each nozzle is always maintained, and a high degree of controlability over the stream temperature is obtained.

It has heretofore been the general practice in steam desuperheating systems to employ a single nozzle, the quantity of water sprayed being regulated by varying the pressure of the water supplied to the jet. With this method of operation it is impossible to obtain accurate and efficient control over a very broad control range because the quantity of water passing through an orifice varies as the square root of the pressure differential there across. For instance, in order to vary quantities of water over a range of about 1 to 10 with a convective fluid stream pressure of about 15 pounds per square inch and a pressure differential across the orifice of about 10 pounds per square inch at the minimum spraying capacity, a maximum pressure differential of approximately 900 pounds per square inch would be necessary. With my invention, however, employing, for example, 5 nozzles with the same 10-pound pressure differential at the minimum of spraying capacity, a maximum pumping pressure of about 55 pounds per square inch will give about the same range of control and with a maximum pumping pressure of about 100 pounds per square inch a range of about 1 to 15 is obtainable.

By operating the nozzles at relatively narrow pressure ranges for which they may be more efficiently designed, my invention also provides for better atomization of the water which, in turn, will give more efficient and rapid cooling of the convective fluid stream and a more thorough mixing of the cooling medium and the cooled fluid.

My invention may be advantageously employed in processes such as that mentioned above wherein close regulation of temperatures is important. It also is, of course, obvious that a system which is designed for a maximum operating pressure of about 100 pounds per square inch will be lower in installation and operating costs than one which must be designed for 900 pounds per square inch operating pressure.

The invention is not to be limited to the specific illustration herein presented because it is readily applicable to many other systems in which a stream of hot convective fluid is employed as a cooling medium and in which said stream is cooled by the evaporation of water introduced thereinto.

In order to make the features and advantages of the invention more apparent, reference is made to the accompanying diagrammatic drawing and the following description thereof.

Fig. 1 of the drawing shows schematically a system employing my invention for controlling the temperature in a catalytic reactor.

Fig. 2 shows an alternate type of control valve which may be utilized to regulate the spraying water.

In the drawing numeral 1 denotes a heat exchange type catalytic reactor. In the particular reactor illustrated the catalyst is confined in a plurality of tubes and processing fluids pass therethrough. The temperature of the reactor is controlled by passing suitable convective fluid therethrough in contact with the exterior of the catalyst-containing tubes in heat exchange relationship with the catalyst. For the sake of simplicity in the drawing only one reactor is shown, but in normal operation a plurality of such reactors would ordinarily be employed.

During the regeneration of the catalyst, confined within the reactor, suitable convective fluid, which in the case herein illustrated is substantially steam, is continually recycled by means of blower 2, the ducts 3 and 4, and branch ducts 5 and 6 through the reactor. During this passage through the reactor the convective fluid will pick up considerable quantities of heat from the regenerating catalyst. This, of course, will depend upon the inlet temperature of the convective fluid and the regeneration temperature level and heat contact of the catalyst as well as the amount of heat exchange surface available. The entrance temperature of the convective fluid is controlled, as hereinafter described, by spraying regulated quantities of water into the hot fluid stream, the evaporation of said water reducing its temperature.

In duct 4 on the discharge side of blower 2 a thermocouple 7 is provided to measure the temperature of the convective fluid stream, variations of which will be transmitted to temperature controller 8 which may be of any suitable type and which may actuate the pressure regulating valve 12 either electrically or by fluid means. In the case herein illustrated, air is used to actuate the valve. Air introduced through line 9 is supplied in regulated quantities by controller 8 to line 10 to motor diaphragm 11 on valve 12. The controller 8 is so arranged that an increase in the temperature of the stream through duct 4 increases the air pressure to line 10 which, in turn, causes motor diaphragm 11 to effect the closing of valve 12, the purpose of which will be hereinafter described.

Water supplied through line 13 to reservoir 14 is withdrawn by means of line 16 and pump 15 to be discharged through line 17, back into the reservoir. The pressure in line 17 is controlled by the previously mentioned valve 12. At spaced points along duct 3 are a plurality of nozzles 18, 18′, 18″, 18‴ and 18⁗. These nozzles, as shown in the case herein illustrated, are preferably of the steam atomizing type. The steam may be introduced in controlled quantities to nozzles 18, 18′, 18″, 18‴ and 18⁗, respectively by means of valves 20, 20′, 20″, 20‴ and 20⁗ in branch lines 19, 19′, 19″, 19‴ and 19⁗ which, in turn, communicate with line 21, which may be connected to a suitable steam supply. During operation it is desirable to supply a certain quantity of steam to all the nozzles in order to keep them cool, even though no water is passing therethrough. The respective nozzles 18, 18′, 18″, 18‴ and 18⁗ are connected by means of lines 22, 22′, 22″, 22‴ and 22⁗ to line 17 and the flow of water thereto is controlled by solenoid operated valves 23, 23′, 23″, 23‴ and 23⁗ respectively.

The valves are operated by means responsive to variations of the pressure in line 17 which, in the case herein illustrated, comprises, pressure controller 24 having a plurality of electrical contact points 25, 25′, 25″, 25‴ and 25⁗, which are connected respectively to solenoids 27, 27′, 27″, 27‴ and 27⁗ by means of conductors 26, 26′, 26″, 26‴ and 26⁗, and contactor 31 which contacts increasing numbers of the electrical contact points as the pressure in line 17 increases. The opposite ends of the individual solenoids are connected by means of conductors 28, 28′, 28″, 28‴ and 28⁗ to a common conductor 29. Conductor 29 and conductor 30, communicating with contactor 31, are connected to a suitable source of electrical current.

The branch ducts 5 and 6 communicate respectively with ducts 36 and 37, which, in turn, communicate with a suitable process flue gas circuit for supplying heat to the chamber during processing and which, not being a part of this invention, is not shown.

Catalyst chamber 1 may be placed either in a heating or cooling circuit by the manipulation of dampers 32, 33, 34, and 35 which, during the regenerating period, will be positioned substantially as shown in the drawing, that is, in such a manner that the flow of gases will be permitted through ducts 5 and 6 but not through ducts 36 and 37.

In order to more fully illustrate the utility of the invention, its operation during the regeneration of catalyst in chamber 1 will be described. At the beginning of the regeneration period a relatively small amount of heat will be generated and as the process progresses the quantity of this heat will increase until it reaches a maximum, after which it will tend to decrease until the end of the period. A stream of flue gases, composed substantially of steam, is circulated through the reaction chamber by means of the communicating ducts and blower 2. As more and more heat is generated within the reactor the temperature of this gas stream will increase, and when the desired maximum is reached, as measured by thermocouple 7, valve 12 in line 17 will be gradually closed by means of controller 8, motor diaphragm 11, and communicating conduit 10. The closing of valve 12 will cause the water pressure in line 17 to increase, and, consequently, contactor 31 will be displaced until connection is made with the first contact point 25. This will complete the electrical circuit and by means of solenoid 27 valve 23 will be opened, causing the flow of water through nozzle 18. The evaporation of said water by the gas stream will cause cooling thereof, but as the regeneration in chamber 1 continues more heat will be absorbed in the convective fluid stream, the temperature of which will continue to rise. This will cause the continued closing of valve 12 and therefore increase the pressure in line 17 until the next contact point 25′ is contacted by contactor 31 and a second electrical circuit, including solenoid 27′, will be completed, causing the opening of valve 23′, which, in turn, will permit water to flow through nozzle 18′. As more and more heat is generated in the catalyst chamber, and consequently more water needed to cool the fluid stream, more nozzles will be brought into operation. As the regeneration progresses and the temperature starts to decrease, the operation of various nozzles will be discontinued in a manner substantially the reverse of that just described. In order to prevent any excessive pressure build up in the circulating system, due to the added water and its evaporation, a suitable back pressure valve 38 in line 39 is provided. This will open when the desired maximum pressure is attained, thereby relieving any excessive pressures in the system.

It is entirely within the scope of this invention to employ, instead of the solenoid operated valves 23, 23′, 23″, 23‴ and 23⁗ in lines 22, 22′, 22″, 22‴ and 22⁗, suitable back pressure operated valves 23ª, as shown in Fig. 2. These valves may be individually set to automatically open or close when any predetermined pressure in line 17 is reached. In this case controller 25 and all the electrical connecting lines may be eliminated.

I claim as my invention:

1. A method for dissipating excess heat from a zone in which heat is generated, which comprises passing in indirect heat exchange relation with said zone a convective fluid at a temperature above the boiling point of water but below the temperature prevailing in said zone, thereby increasing the temperature of said fluid, removing the latter from heat exchange relation with said zone and cooling the same by injection of water thereinto at a regulated rate and evaporation of the thus injected water, subsequently returning resultant cooled fluid, including steam evolved from the injected water, into heat exchange relation in said zone, and controlling said rate by varying the upstream pressure of said water in response to variations in the tempertaure of said fluid at a point in its circulation between said cooling and said return into heat exchange relation with said zone and varying the number of points of water injection as said pressure varies.

2. An apparatus of the class described comprising an exothermic reactor having an inlet and an outlet, a conduit externally of said reactor and connecting the outlet and the inlet, means for circulating fluid from said outlet through said conduit to said inlet, cooling means associated with said conduit and comprising a plurality of water injectors, a common header for said injectors and means for maintaining water pressure in said header, means for varying the pressure in said header in response to temperature variations in said conduit, a valve for each of said injectors, and a control device communicating with said header and operatively associated with each of said valves to vary the number of said water injectors in communication with said header in response to pressure variations in the header.

3. An apparatus of the class described comprising an exothermic reactor having an inlet and an outlet, a conduit externally of said reactor and connecting the outlet and the inlet, means for circulating fluid from said outlet through said conduit to said inlet, cooling means associated with said conduit and comprising a plurality of water injectors, a common header for said injectors and a pipe connecting each of the injectors with the header, a pressure regulating valve in said header, means for actuating said valve to vary the pressure in said header in response to temperature variations in said conduit, a vavle in each of said pipes, and means for actuating each of the last-named valves in response to a different predetermined pressure in said header for varying the number of water injectors in communication with the header.

4. A method for dissipating excess heat from a zone in which heat is generated, which comprises passing in indirect heat exchange relation with said zone a convective fluid at a temperature above the boiling point of water but below the temperature prevailing in said zone, thereby increasing the temperature of said fluid, removing the thus heated fluid from heat exchange relation with said zone, maintaining a supply of water under pressure, cooling said heated fluid by injection of water thereinto from said supply at a regulated rate, subsequently returning resultant cooled fluid into heat exchange relation with said zone, and controlling said rate by varying the pressure of said water supply in response to variations in the temperature of the circulating fluid at a point exteriorly of said zone and varying the number of points of water injection as said pressure varies.

5. An apparatus of the class described comprising an exothermic reactor having an inlet and an outlet, a conduit externally of said reactor and connecting the outlet and the inlet, means for circulating fluid from said outlet through said conduit to said inlet, a header and a pressure regulating valve therein, a plurality of injectors communicating wtih the header and wtih said conduit, a temperature controller having a thermocouple at a control point in said conduit and associated with said valve to vary the pressure in the header in response to temperature variations at said control point, a valve for each of said injectors, and means for actuating each of the last-named valves in response to a different predetermined pressure in said header.

LEV A. MEKLER.